(12) United States Patent
Miyashita et al.

(10) Patent No.: US 6,703,078 B2
(45) Date of Patent: Mar. 9, 2004

(54) METAL GASKET RAW MATERIAL PLATE AND MANUFACTURING METHOD THEREFOR

(75) Inventors: Masabumi Miyashita, Saitama (JP); Shingo Watanabe, Saitama (JP); Norifumi Misumi, Saitama (JP); Naomichi Mitsuyama, Saitama (JP)

(73) Assignee: Nippon Leakless Industry Co., Ltd., Tokyo (JP)

( * ) Notice: Subject to any disclaimer, the term of this patent is extended or adjusted under 35 U.S.C. 154(b) by 5 days.

(21) Appl. No.: 10/076,391

(22) Filed: Feb. 19, 2002

(65) Prior Publication Data

US 2003/0022005 A1 Jan. 30, 2003

(30) Foreign Application Priority Data

Jul. 16, 2001 (JP) .................................... 2001-215073

(51) Int. Cl.[7] .................................................. B05D 1/00
(52) U.S. Cl. ...................... 427/409; 427/379; 427/413
(58) Field of Search .................... 106/287.1; 427/379, 427/409, 413; 428/457, 460, 461, 500, 920

(56) References Cited

U.S. PATENT DOCUMENTS

| 5,130,203 | A | | 7/1992 | Abe et al. |
| 5,433,976 | A | | 7/1995 | van Ooij et al. |
| 5,510,191 | A | | 4/1996 | Higashira et al. |
| 5,532,026 | A | * | 7/1996 | Jinno .......................... 427/409 |
| 6,391,465 | B1 | * | 5/2002 | Zheng et al. ................ 428/450 |

FOREIGN PATENT DOCUMENTS

| JP | A 1-141620 | 6/1989 |
| JP | A 1-251073 | 10/1989 |
| JP | A 3-149465 | 6/1991 |
| JP | A 4-83770 | 3/1992 |
| JP | 7 216309 A | 8/1995 |
| JP | A 9-296865 | 11/1997 |

* cited by examiner

Primary Examiner—Deborah Jones
Assistant Examiner—G. A. Blackwell-Rudasill
(74) Attorney, Agent, or Firm—Young & Thompson

(57) ABSTRACT

There is provided a non-chromium treated material in which peeling resistance between a metal plate and a rubber layer via a primer layer and a bond layer, which is decreased by fretting and antifreeze liquid, can be improved, the rubber layer is less liable to peel from the metal plate, and the material has little effect on the environment and human body. In a metal gasket raw material plate 1 of a laminated form in which a rubber layer 5 is provided on a stainless steel plate 2 via a bonding layer 4, a primer layer 3 of a silica-alumina condensate is formed on the surface of the stainless steel plate 2.

6 Claims, 5 Drawing Sheets

Waterproof bonding property

METAL GASKET RAW MATERIAL PLATE AND MANUFACTURING METHOD THEREFOR

BACKGROUND OF THE INVENTION

1. Field of the Invention

The present invention relates to a metal gasket raw material plate and, more particularly, to a laminated metal gasket raw material plate in which a rubber layer is provided on a metal plate, and a manufacturing method therefor.

2. Prior Art

Conventionally, as a gasket raw material plate used around an engine mounted on a vehicle etc., a material plate in which asbestos is stiffened by nitrile rubber, phenolic resin, or the like and is laminated has been used. However, because of the recent restriction of asbestos, a laminated metal gasket raw material plate in which a rubber layer is provided on a metal plate via an adhesive layer without the use of asbestos like a rubber coated metal has been used as disclosed in Japanese Patent Application Opened No. H2-38760.

For example, when a gasket is used in a portion in which temperature is changed greatly by repeated operation and stoppage of engine, such as a gasket insertion portion of engine, fretting occurs at the interfaces with engine and gasket due to the temperature change. On the other hand, in particular, a gasket in which a metal plate to which an adhesive is applied is coated with fluororubber, acrylonitrile rubber, etc. to form a rubber layer has high frictional resistance and thus is less liable to slip because the surface of gasket consists of the rubber layer.

For this reason, if a gasket having the surface consists of a rubber layer is used for an engine, a high shearing stress is created by the fretting, and resultantly a peeling phenomenon takes place between the metal plate and the bonding layer. As a result, there arises a problem in that the rubber layer peels off from the metal plate. Also, cooling water (antifreeze liquid containing an electrolyte component), which is one of objects to seal the gasket, may permeate in the surface of metal plate, so that an alkaline substance is formed. By this phenomenon as well, a peeling phenomenon is caused between the metal plate and the bonding layer. As a result, there arises a problem in that the rubber layer peels off from the metal plate.

In order to eliminate the above-described peeling phenomena, conventionally, aqueous solution containing a chromium compound, phosphoric acid, and silica (commercially available coating type chromate treatment agent, for example, trade name Surfcoat NRC300TH manufactured by Nippon Paint Co., Ltd. or trade name Zinchrom R1415 manufactured by Nihon Parkerizing Co., Ltd.) is applied onto the surface of a metal plate such as an aluminum plate, iron plate, and galvanized steel plate etc. by the impregnation method or roll coat method, and is dried to form a composite coating.

However, as environmental problems have become serious in recent years, it has been demanded to make the load to environment as small as possible in the surface treatment of gaskets. In particular, chromate treatment using chromium oxide presents a problem of the discharge of industrial wastes, adverse influence of hexavalent chromium on the environment, or toxic effect on human body. Therefore, it is inevitable for rubber coating to develop a pretreatment technology having little effect on the environment and human body.

SUMMARY OF THE INVENTION

An object of the present invention is to provide a non-chromium treated material in which peeling resistance between a metal plate and a rubber layer via a primer layer and a bonding layer, which is decreased by fretting and antifreeze liquid, can be improved, the rubber layer is less liable to peel from the metal plate, and the material has little effect on the environment and human body.

The present invention has been made to advantageously solve the above problems. The invention provides a metal gasket raw material plate of a laminated form in which a rubber layer is provided on a metal plate via a bonding layer, wherein a primer layer of a silica-alumina condensate is formed between the surface of the metal plate and the bonding layer.

For the metal gasket raw material plate in accordance with the present invention, the primer layer of a silica-alumina condensate bonded chemically to the surface of metal plate is formed on the surface of metal plate by a condensation reaction. On the other hand, the silica-alumina condensate of the primer layer is bonded chemically to the bonding layer, and the alumina of the silica-alumina condensate projects from the primer layer to serve as an anchor between the primer layer and the bonding layer, so that the rubber layer is fixed firmly to the metal plate via the primer layer and the bonding layer.

Therefore, according to the metal gasket raw material plate in accordance with the present invention, since the metal plate, primer layer, and bonding layer are bonded chemically to each other, the bond strength can further be increased and the peeling resistance between the metal plate and the rubber layer via the primer layer and the bonding layer can be improved as compared with the conventional chromate treatment agent. Thereby, the rubber layer can be certainly prevented from peeling from the metal plate.

Moreover, according to the metal gasket raw material plate in accordance with the present invention, since chromium oxide is not used in the surface treatment of gasket, the before-mentioned problem of adverse influence on the environment or toxic effect on human body occurring when chromium oxide is used does not arise, and a metal gasket raw material plate having little effect on the environment and human body can be provided.

Further, the invention provides a manufacturing method for a metal gasket raw material plate in which when the primer layer of the metal gasket raw material plate according to the present invention is formed, a mixture produced by mixing aluminum hydroxide with a silane coupling agent at a ratio of 0.5 to 15% by weight of aluminum hydroxide to 5% by weight of solid content in the silane coupling agent is applied onto the surface of the metal plate and is heated.

In the manufacturing method for a metal gasket raw material plate in accordance with the present invention, for example, fine powders of aluminum hydroxide (for example, trade name Higilite H-42M manufactured by Showa Denko K. K.) is added to, for example, an amino silane based or epoxy silane based silane coupling agent (for example, trade name KBM602 or KBM403 manufactured by Shin-Etsu Chemical Co., Ltd. or trade name NUC Silicone Primer APZ-6633 manufactured by Nippon Unicar Co., Ltd.) in a ratio of 0.5 to 15% by weight of aluminum hydroxide to 5% by weight of solid content in the silane coupling agent, and is agitated and dispersed until the mixture becomes homogeneous. Then, the mixture is applied directly onto the surface of a metal plate (for example, a stainless steel plate of SUS301S etc.) formed of an alloy containing chromium, by using, for example, a roll coater, and is heated at a temperature of 250 to 300° C. for several minutes. Thereupon, a dehydration condensation reaction takes place, so that hydroxyl group of aluminum hydroxide and hydrogen of the silane coupling agent are bonded chemically to each other, and water is removed therefrom to yield aluminum oxide (alumina). The yielded aluminum oxide projects from the primer layer to serve as an anchor between the primer layer and the bonding layer. On the other hand, between the metal plate and the silane coupling agent, water is removed from the silane coupling agent, so that chromium in the metal plate and the aforementioned aluminum oxide are bonded chemically to each other via silicon contained in silica of the silane coupling agent. Thereby, the primer layer of a silica-alumina condensate bonded chemically to the metal plate is formed on the surface of the metal plate.

Furthermore, for example, a phenol-based or epoxy-based adhesive is applied onto the primer layer by using, for example, a roll coater, and is heated at a temperature of, for example, 250 to 300° C. for 0.5 to 5 minutes. Thereby, the primer layer having been bonded chemically to the metal plate and the adhesive having been applied thereto are bonded chemically to each other to form the bonding layer on the primer layer. Then, the rubber layer of, for example, acrylonitrile-butadiene rubber (NBR) based synthetic rubber or the like is provided on the bonding layer.

Therefore, according to the manufacturing method for a metal gasket raw material plate in accordance with the present invention, since the metal plate, primer layer, and bonding layer are bonded chemically to each other, the bond strength can be increased further and the peeling resistance between the metal plate and the rubber layer via the primer layer and the bonding layer can be improved as compared with the metal gasket using the conventional chromate treatment agent. Thereby, the rubber layer can be certainly prevented from peeling from the metal plate.

Moreover, according to the manufacturing method for a metal gasket raw material plate in accordance with the present invention, since chromium oxide is not used in the surface treatment of gasket, the before-mentioned problem of adverse influence on the environment or toxic effect on human body occurring when chromium oxide is used does not arise, and a manufacturing method for a metal gasket raw material plate having little effect on the environment and human body can be provided.

Further, in the manufacturing method for a metal gasket raw material plate in accordance with the present invention, the particle size (particle diameter) of the aluminum hydroxide may be in the range of 0.5 to 5 µm. In this case, the anchoring property between the bonding layer and the primer layer can be kept high and also a smooth primer layer can be formed due to the fine powders of alumina of silica-alumina condensate in the primer layer.

As described above, the particle size of aluminum hydroxide is in the range of 0.5 to 5 µm. The reason for this is that if the particle size of alminum hydroxide is smaller than 0.5 µm, the anchoring property between the primer layer and the bonding layer decreases because the particles of alumina in the silica-alumina condensate formed by the dehydration condensation reaction are too small, and on the other hand, if the particle size of alminum hydroxide is larger than 5 µm, the particles in the primer layer come out onto the surface of the primer layer, so that the primer layer is not smooth.

DETAILED DESCRIPTION OF THE PREFERRED EMBODIMENTS

Figure 1:
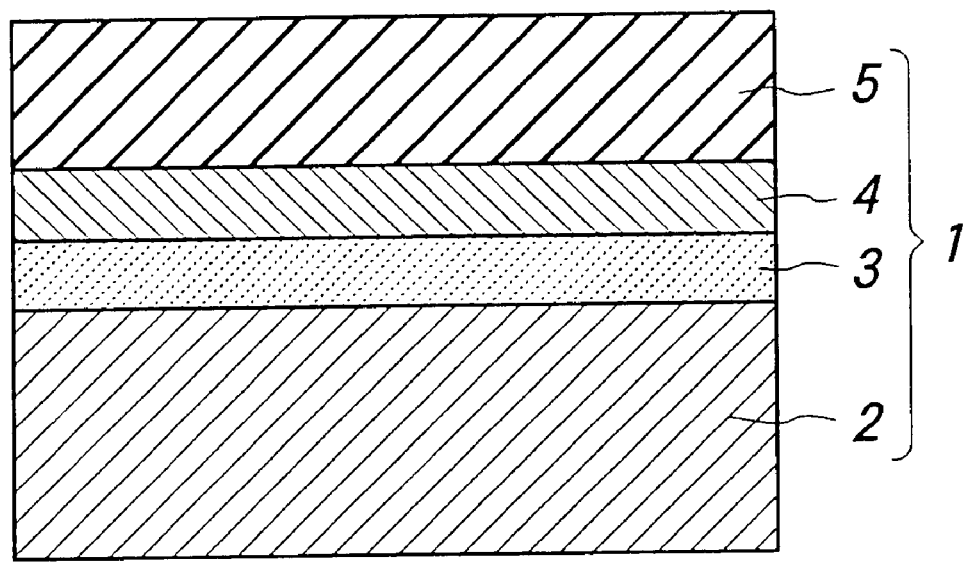
FIG. 1 is a sectional view showing one embodiment of a metal gasket raw material plate in accordance with the present invention, manufactured by a manufacturing method for a metal gasket raw material plate in accordance with the present invention.

An embodiment of the present invention will now be described in detail with reference to the accompanying drawings. FIG. 1 is a sectional view showing one embodiment of a metal gasket raw material plate manufactured by a manufacturing method for a metal gasket raw material plate in accordance with the present invention. In FIG. 1, reference numeral 1 denotes a metal gasket raw material plate, 2 denotes a metal plate, 3 denotes a primer layer, 4 denotes a bonding layer, and 5 denotes a rubber layer.

In the manufacturing method for a metal gasket raw material plate of this embodiment, 0.5 to 15% by weight of fine powders of aluminum hydroxide (for example, trade name Higilite H-42M manufactured by Showa Denko K. K.) is added to an amino silane based or epoxy silane based silane coupling agent (for example, trade name KBM602 or KBM403 manufactured by Shin-Etsu Chemical Co., Ltd. or trade name NUC Silicone Primer APZ-6633 manufactured by Nippon Unicar Co., Ltd. etc.) containing 5% by weight of solid content, and is agitated and dispersed until the mixture becomes homogeneous. Then, the mixture is applied directly onto the surface of the metal plate (for example, a stainless steel plate of SUS301S etc.) 2 formed of an alloy containing chromium by using a roll coater, and is heated at a temperature of 250 to 300° C. for several minutes. Thereupon, a dehydration condensation reaction takes place, so that hydroxyl group of aluminum hydroxide and hydrogen of the silane coupling agent are bonded chemically to each other, and water is removed therefrom to yield aluminum oxide (alumina). The yielded aluminum oxide projects from the primer layer 3 to serve as an anchor between the primer layer 3 and the bonding layer 4 formed on the primer layer 3. On the other hand, between the metal plate 2 and the silane coupling agent, water is removed from the silane coupling agent, so that chromium in the metal plate 2 and the aforementioned aluminum oxide are bonded chemically to each other via silicon contained in silica of the silane coupling agent. Thereby, the primer layer 3 of a silica-alumina condensate bonded chemically to the metal plate 2 is formed on the surface of the metal plate 2.

Furthermore, a phenol-based or epoxy-based adhesive is applied onto the primer layer 3 by using a roll coater, and is heated at a temperature of 250 to 300° C. for 0.5 to 5 minutes. Thereby, the primer layer 3 having been bonded chemically to the metal plate 2 and the adhesive having been applied thereto are bonded chemically to each other to form the bonding layer 4 on the primer layer 3. In this embodiment, the rubber layer 5 of acrylonitrile-butadiene rubber (NBR) based synthetic rubber or the like is provided on the bonding layer 4.

Therefore, according to the manufacturing method for a metal gasket raw material plate of this embodiment, since the metal plate 2, the primer layer 3, and the bonding layer 4 are bonded chemically to each other, the bond strength can be increased further as compared with the metal gasket using the conventional chromate treatment agent, and the peeling resistance between the metal plate 2 and the rubber layer 5 via the primer layer 3 and the bonding layer 4 can be improved. Thereby, the rubber layer 5 can be certainly prevented from peeling from the metal plate 2.

Figure 5A:
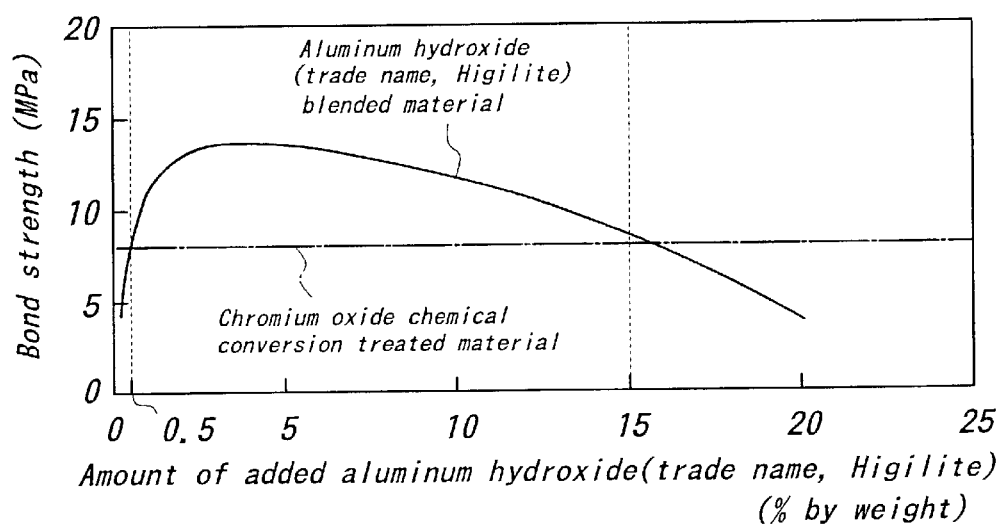
FIGS. 5(a), (b) are graphs showing examples of comparison of a primer layer formed by blending aluminum hydroxide with a silane coupling agent in the embodiment of the present invention with a primer layer using a conventional general chemical conversion treatment agent using a chromium oxide, FIG. 5(a) being a graph showing the relationship between the amount of added aluminum hydroxide (% by weight) and the bond strength (MPa), and FIG. 5(b) being a graph showing the relationship between amount of added aluminum hydroxide (% by weight) and the number of times of sliding (times) before the primer layer peels off.
Figure 5B:
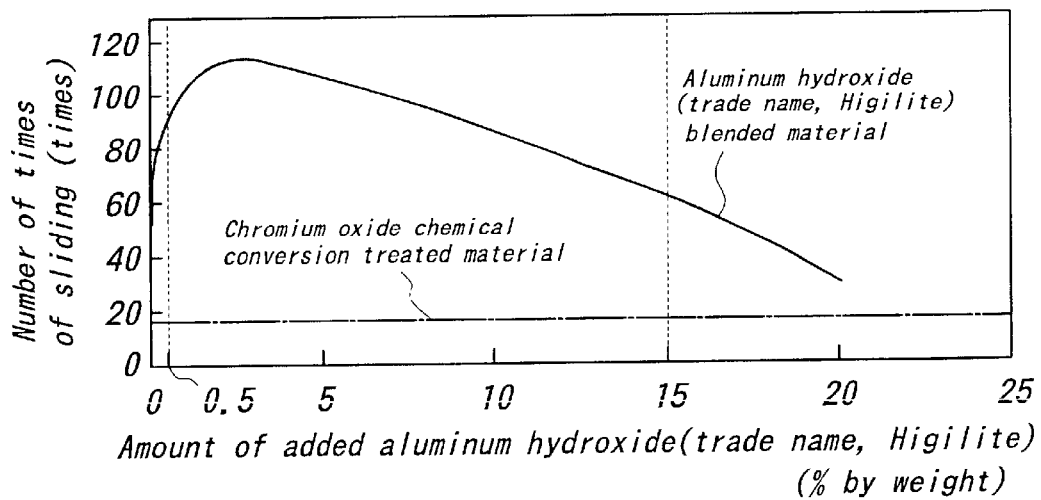

In order to clarify the influence of the amount of addition of aluminum hydroxide added to the silane coupling agent, FIG. 5 shows results of comparison of the metal gasket raw material plate in the case where 0 to 20% by weight of aluminum hydroxide (trade name Higilite manufactured by Showa Denko K. K.) is added to a silane coupling agent containing 5% by weight of solid content (in the figure, aluminum hydroxide (trade name Higilite) blended material) with a conventional product using a general chemical conversion treatment agent using a chromium oxide as a primer layer (in the figure, chromium oxide chemical conversion treated material). FIG. 5(a) shows the relationship between the amount of added aluminum hydroxide (% by weight) and the bond strength (MPa), and FIG. 5(b) shows the relationship between the amount of added aluminum hydroxide (% by weight) and the number of times of sliding (times) before the primer layer (the rubber layer via the primer layer) peels off. As the metal plate, a stainless steel plate is used.

FIGS. 5(a) and 5(b) reveal that when the amount (% by weight) of added aluminum hydroxide (trade name Higilite) is in the range of about 0.5 to 15% by weight, the bond strength and the number of times of sliding before peeling of the metal gasket raw material plate in accordance with this embodiment are higher than those of the conventional product using a general chromium oxide. Therefore, according to the manufacturing method for a metal gasket raw material plate of this embodiment, by mixing 0.5 to 15% by weight of aluminum hydroxide with the silane coupling agent containing 5% by weight of solid content, the bonding property between the metal plate and the rubber layer via the primer layer and the bonding layer can be improved as compared with the conventional product using a general chemical conversion treatment agent using a chromium oxide as a primer layer, so that a metal gasket raw material plate in which the bond strength is high and the rubber layer is difficult to peel from the metal plate can be formed.

Moreover, according to the manufacturing method for a metal gasket raw material plate in accordance with this embodiment, since chromium oxide is not used in the surface treatment of gasket, the before-mentioned problem of adverse influence on the environment or toxic effect on human body occurring when chromium oxide is used does not arise, and a manufacturing method for a metal gasket raw material plate having little effect on the environment and human body can be provided.

The particle size (particle diameter) of aluminum hydroxide used in the manufacturing method in accordance with this embodiment is desirably made in the range of 0.5 to 5 $\mu$m. In this case, the anchoring property between the bonding layer and the primer layer can be kept high and also a smooth primer layer can be formed due to the fine powders of alumina of silica-alumina condensate in the primer layer.

As described above, the particle size of aluminum hydroxide is in the range of 0.5 to 5 $\mu$m. The reason for this is that if the particle size is smaller than 0.5 $\mu$m, the anchoring property between the primer layer and the bonding layer decreases because the particles of alumina in the silica-alumina condensate formed by the dehydration condensation reaction are too small, and on the other hand, if the particle size is larger than 5 $\mu$m, the particles in the primer layer come out onto the surface of the primer layer, so that the primer layer is not smooth.

Also, according to the metal gasket raw material plate 1 manufactured as described above, since the metal plate 2, the primer layer 3, and the bonding layer 4 are bonded chemically to each other, the bond strength can be increased further as compared with the conventional chromate treated material, and the peeling resistance between the metal plate 2 and the rubber layer 5 via the primer layer 3 and the bonding layer 4 can be improved. Thereby, the rubber layer 5 can be certainly prevented from peeling from the metal plate 2.

Moreover, according to the metal gasket raw material plate 1, since chromium oxide is not used in the surface treatment of gasket, the problem of adverse influence on the environment or toxic effect on human body occurring when chromium oxide is used does not arise, thus a metal gasket raw material plate having little effect on the environment and human body can be provided.

EXAMPLES

Next, one example of the metal gasket raw material plate in accordance with the present invention and one example of the manufacturing method therefor will be described. For the metal gasket raw material plate 1 of this example, the stainless steel plate (SUS301S) containing chrominum is used as the metal plate 2 shown in FIG. 1 shown before, the primer layer 3 is formed on the surface of the metal plate 2, the bonding layer 4 is formed on the primer layer 3, and further the rubber layer 5 is provided on the bonding layer 4.

In the manufacturing method for a metal gasket raw material plate of this example for manufacturing the metal gasket raw material plate 1 of this example, 2% by weight of fine powders of aluminum hydroxide (trade name Higilite H-42M manufactured by Showa Denko K. K., average particle size (average particle diameter) of 1.0 $\mu$m) is added to an amino silane based silane coupling agent (trade name NUC Silicone Primer APZ-6633 manufactured by Nippon Unicar Co., Ltd.) containing 5% by weight of solid content, and is agitated and dispersed until the mixture becomes homogeneous. Then, 800 to 1200 mg/m$^2$ of the mixture is applied onto the surface of the stainless steel plate 2 by using a roll coater, and is heated at a temperature of 250 to 300°

C. for several minutes. Thereupon, a dehydration condensation reaction takes place, so that the primer layer 3 of silane-alumina condensate with a thickness of about several microns that is bonded chemically onto the surface of the stainless steel plate 2 and has a high bond strength is formed.

Furthermore, a phenol-based adhesive is applied onto the primer layer 3 by using a roll coater, and is heated at a temperature of 250 to 300° C. for 0.5 to 5 minutes. Thereby, the adhesive is bonded chemically to the primer layer 3, by which the bonding layer 4 having a high bond strength is formed. In this example, the rubber layer 5 is formed on the bonding layer 4 by coating acrylonitrile-butadiene rubber (NBR) based synthetic rubber with a thickness of 15 to 30 μm. Thereby, the laminated metal gasket raw material plate 1 as shown in FIG. 1, in which the rubber layer 5 is provided on the stainless steel plate 2 via the primer layer 3 and the bonding layer 4, is manufactured.

Figure 2:
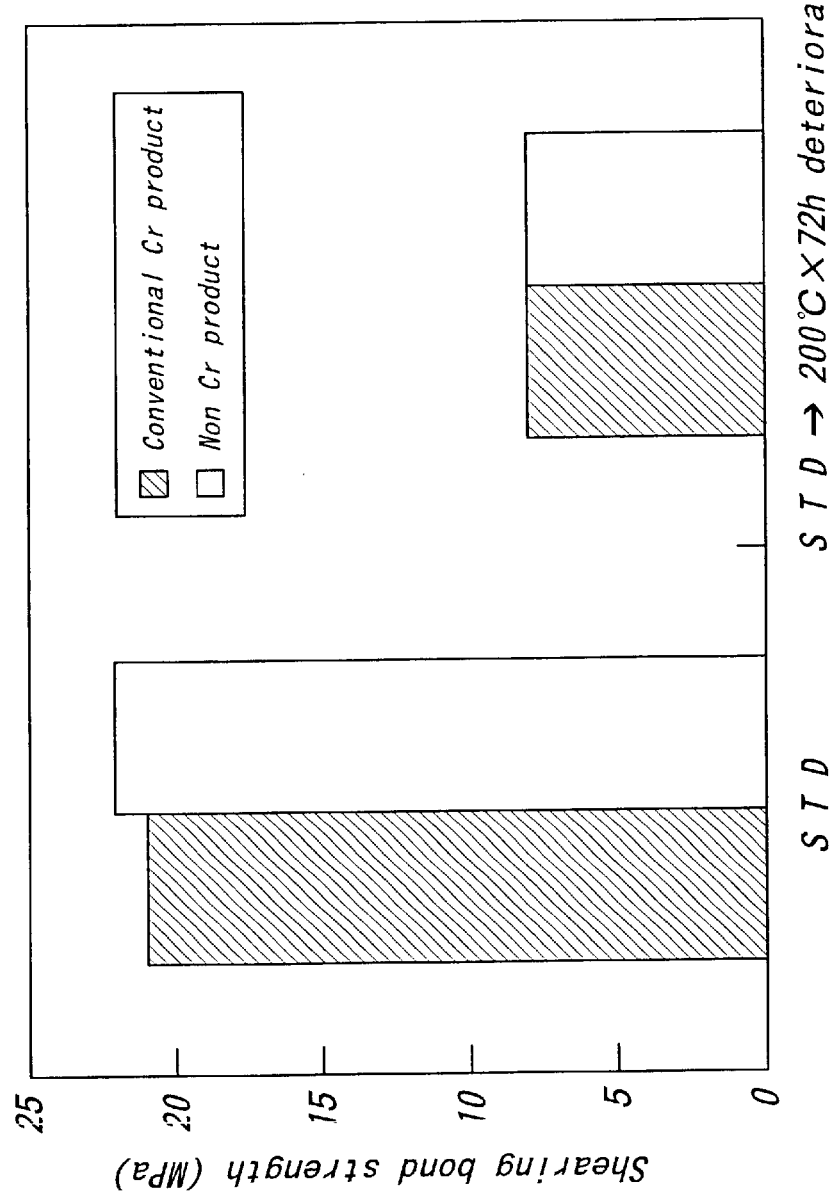
FIG. 2 is an explanatory view showing a result of evaluation of shearing bond strength obtained by the testing method for automotive sealing materials (JIS K6830) for a metal gasket raw material plate in accordance with one embodiment of the present invention manufactured by a manufacturing method for a metal gasket raw material plate in accordance with one embodiment of the present invention.
Figure 3:
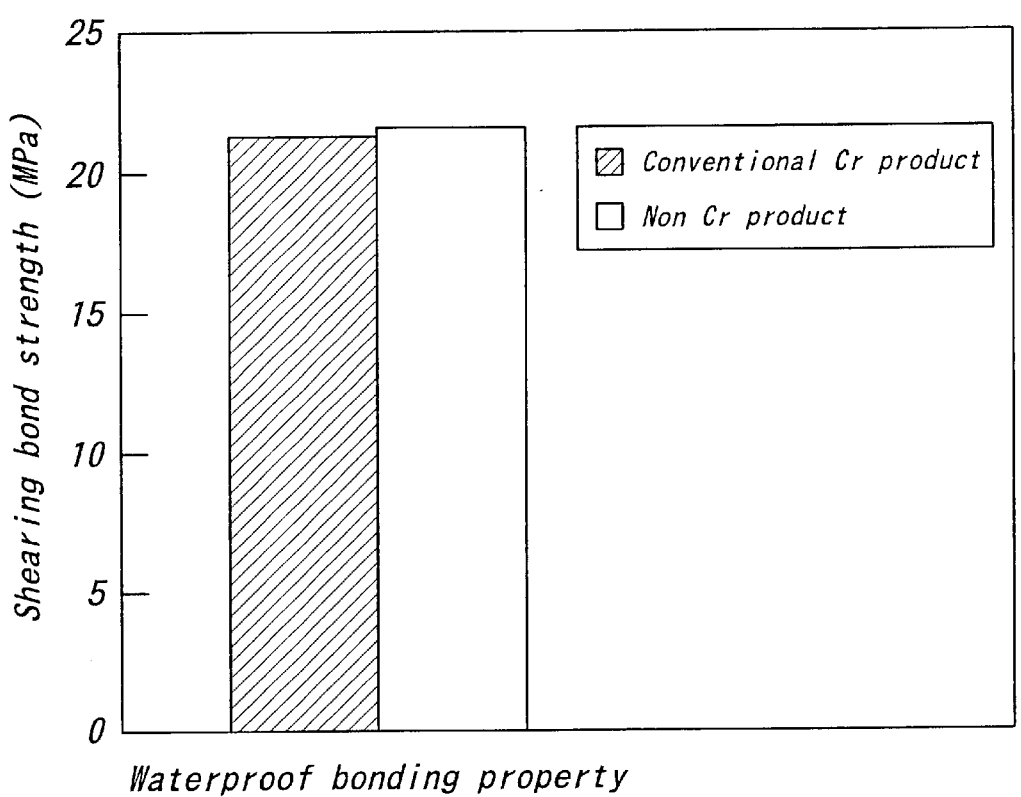
FIG. 3 is an explanatory view showing a comparison of the waterproof bond strength between a stainless steel plate and a primer layer for a metal gasket raw material plate in accordance with the embodiment with that for a conventional product (conventional Cr product)

To investigate the bond strength between the stainless steel plate 2 and the primer layer 3 for the metal gasket raw material plate 1 of this example manufactured as described above by the manufacturing method for a metal gasket raw material plate of this example, the shearing bond strength was evaluated by using the testing method for automotive sealing materials (JIS K6830). The evaluation result is shown in FIG. 2. FIG. 3 shows a result of evaluation of shearing bond strength, like FIG. 2, with respect to the waterproof bonding property. In FIGS. 2 and 3, for non-chromium primer (non Cr product) without the use of chromium in the metal gasket raw material plate of this example, the values of shearing bond strength (MPa) of a sample immediately after manufacture (STD) and a sample obtained by deteriorating the STD sample by heating at 200° C. for 72 hours were measured, and the values of shearing bond strength (MPa) were compared with those of the conventional product formed by using chromium in the primer layer (conventional Cr product).

As shown in FIGS. 2 and 3, under either condition of shearing bond strength and shearing bond strength with respect to waterproof bonding property, the non-chromium primer (non Cr product) of this example is equivalent to or better than the conventional product (conventional Cr product).

Figure 4:
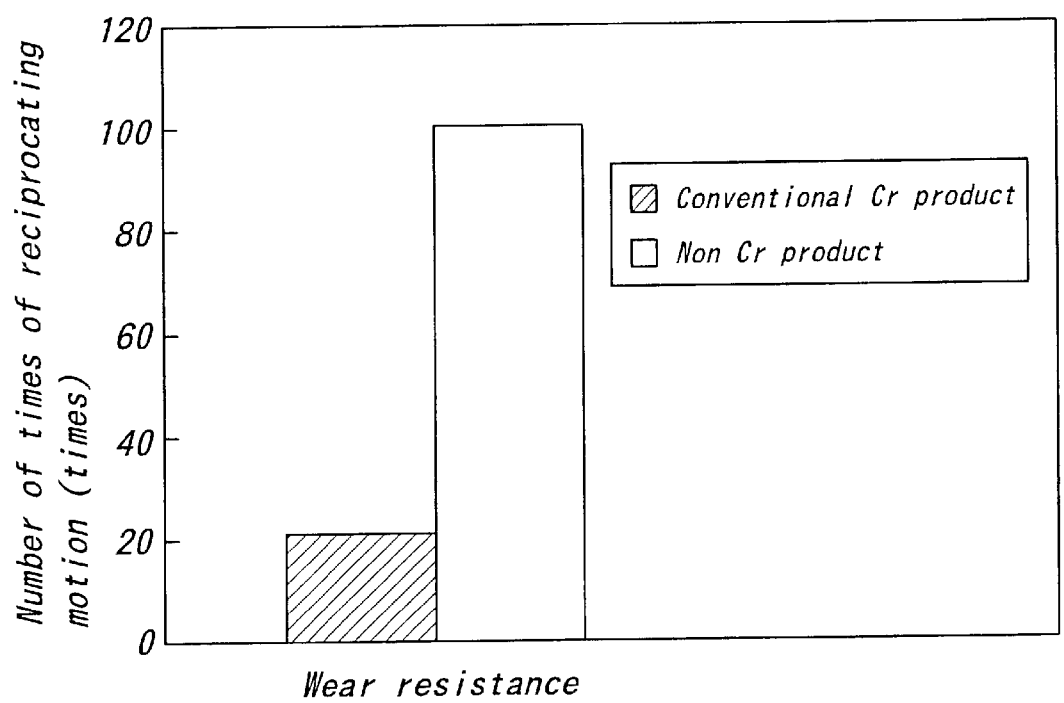
FIG. 4 is an explanatory view showing a comparison of evaluation of wear resistance for a metal gasket raw material plate in accordance with the embodiment with that for a conventional product (conventional Cr product)

Also, since the wear resistance of metal gasket raw material plate is one factor of the important functions, the wear resistance of the metal gasket raw material plate 1 of this example was evaluated by using a low-load wear testing machine (manufactured by Rhesca Co., Ltd., trade name FPR2000R) complying with the testing method for wear resistance of materials for artificial joints by pin-on-disk method (JIS T0303). The result of evaluation is shown in FIG. 4. The scale of wear resistance is the number of times of reciprocating motion. According to this result, it is found that the metal gasket raw material plate 1 of this example manufactured by the manufacturing method of this example, in which the primer layer 3 is a non Cr product, has exponentially improved wear resistance as compared with the conventional product (conventional Cr product) using the conventional primer layer using chromium.

Furthermore, for the metal gasket raw material plate 1 of this example, the effect of addition of 2% by weight of aluminum hydroxide fine particles (trade name Higilite H-42M; manufactured by Showa Denko K. K.) to the amino silane based silane coupling agent (trade name NUC Silicone Primer APZ-6633 (containing 5% by weight of solid content); manufactured by Nippon Unicar Co., Ltd.) was investigated by measuring bond strength after thermal deterioration (MPa), number of times of sliding before peeling (times), and peeling time in immersion in antifreeze liquid (hours). In this investigation, the conventional chromium oxide chemical conversion treated material and raw material plates using admixtures other than aluminum hydroxide, which were taken as comparative examples, were also investigated. The investigation result is given in Table 1.

TABLE 1

| | Blending | Bond strength after thermal deterioration (MPa) | Number of times of sliding before peeling (times) | peeling time in immersion in antifreeze liquid (hours) |
| --- | --- | --- | --- | --- |
| Chromium oxide chemical conversion treated material | — | 8 | 15 | 240 |
| This example | Higilite H-42 2 wt % | 13 | 101 | 240 |
| Comparative example 1 | Not blended | Peeling occurred | 1 | — |
| Comparative example 2 | Alumina 2 wt % | Peeling occurred | 82 | — |
| Comparative example 3 | Silica 2 wt % | Peeling occurred | 1 | — |
| Comparative example 4 | Higilite H-42 2 wt % fired at 800° C. | Peeling occurred | 93 | — |

Remarks: Bond strength after thermal deterioration was measured after treatment of 200° C. × 20 h.
Antifreeze liquid resistance was measured in 120° C. autoclave.

In Table 1, a metal gasket raw material plate in which the primer layer is formed by a primer using only the silane coupling agent (trade name NUC Silicone Primer APZ-6633; manufactured by Nippon Unicar Co., Ltd.) (a primer in which an addition agent of aluminum hydroxide etc. is not blended) is taken as comparative example 1. Metal gasket raw material plates in which the primer layer is formed by a primer in which 2% by weight of alumina, 2% by weight of silica, and 2% by weight of Higilite H-42 fired at 800° C. (changed from aluminum hydroxide to aluminum oxide) are blended with the primer of comparative example 1 being used as a base are taken as comparative examples 2, 3 and 4, respectively.

According to Table 1, it is found that the primer layer 3 of this example, in which Higilite H-42 is added, has improved bond strength after thermal deterioration and number of times of sliding before peeling as compared with comparative examples 1 to 3. Also, it is found from Table 1 that unlike this example, for the primer layer formed by a primer in which Higilite H-42 fired at 800° C. is blended, hydroxyl group to be bonded chemically is removed by a dehydration reaction by the firing of aluminum hydroxide (trade name Higilite H-42) at 800° C., and aluminum hydroxide is changed to aluminum oxide, so that a proper dehydration condensation reaction does not take place, by which the bond strength after thermal deterioration decreases as compared with this example. Therefore, when Higilite H-42 is added to a coupling agent and is heated at a temperature of 250 to 300° C. as in the case of the primer layer 3 of this example, a proper dehydration condensation reaction takes place, so that the metal gasket raw material plate 1 in which the bond strength can be increased and the rubber layer 5 is less liable to peel off can be formed.

Moreover, in the manufacturing method for a metal gasket raw material plate of this example, since 2% by weight of aluminum hydroxide is added to the silane coupling agent containing 5% be weight of solid content to form the primer layer 3 as shown the above-described FIG. 5(*a*) and FIG. 5(*b*), both the bond strength and the number of times of sliding before peeling can reach to values near the maximum. Thereby, the bonding property between the stainless steel plate 2 and the rubber layer 5 via the primer layer 3 and the bonding layer 4 can be enhanced. Thus, the bond strength is high and the rubber layer 5 is far less liable to peel from the stainless steel plate 2.

The present invention has been described with reference to the example, but the present invention is not limited to the above-described example. For example, although stainless steel has been used as the material of metal plate in the above-described example, the material of metal plate is not limited to this. Any material that is bonded chemically to the primer layer by a dehydration condensation reaction, like stainless steel plate, by forming the primer layer in which aluminum hydroxide is added to a silane coupling agent, can be used for the metal plate in the present invention.

What is claimed is:

1. A manufacturing method for a metal gasket raw material plate comprising the steps of:

mixing aluminum hydroxide with a silane coupling agent at a ratio of 0.5 to 15% by weight of aluminum hydroxide to 5% by weight of solid content in said silane coupling agent to form a primer layer;

applying said primer layer onto a surface of a metal plate; and heating said primer layer at a temperature of 250 to 300° C.

2. The manufacturing method for a metal gasket raw material plate according to claim 1, wherein the particle size of said aluminum hydroxide is in the range of 0.5 to 5 μm.

3. The manufacturing method for a metal gasket raw material plate according to claim 1, wherein said weight of aluminum hydroxide is 2% by weight.

4. The manufacturing method for a metal gasket raw material plate according to claim 1, further comprising the steps of:

applying one of a phenol-based and an epoxy-based adhesive to said primer layer; and heating said adhesive to 250 to 300° C. for 0.5 to 5 minutes.

5. The manufacturing method for a metal gasket raw material plate according to claim 4, further comprising the step of coating said adhesive with a rubber layer.

6. A manufacturing method for a metal gasket raw material plate comprising the steps of:

mixing aluminum hydroxide with a silane coupling agent at a ratio of 0.5 to 15% by weight of aluminum hydroxide to 5% by weight of solid content in said silane coupling agent to form a primer layer;

applying said primer layer onto a surface of a metal plate;

heating said primer layer at a temperature of 250 to 300° C.;

applying one of a phenol-based and an epoxy-based adhesive to said primer layer;

heating said adhesive; and coating said adhesive with a rubber layer.

* * * * *